Sept. 9, 1947.   O. R. NEMETH   2,427,327
FILM GATE
Filed Oct. 26, 1944   4 Sheets-Sheet 1

Fig.1.

Inventor
Otto R. Nemeth
BY
R. J. Schwarz
Attorney.

Sept. 9, 1947.  O. R. NEMETH  2,427,327
FILM GATE
Filed Oct. 26, 1944  4 Sheets-Sheet 3

Inventor
Otto R. Nemeth
By
R. J. Schwarz
Attorney.

Sept. 9, 1947.   O. R. NEMETH   2,427,327
FILM GATE
Filed Oct. 26, 1944   4 Sheets-Sheet 4

Patented Sept. 9, 1947

2,427,327

UNITED STATES PATENT OFFICE 2,427,327

FILM GATE

Otto R. Nemeth, Chicago, Ill., assignor, by mesne assignments, to Helene Curtis Industries, Inc., a corporation of Illinois Application October 26, 1944, Serial No. 560,370

7 Claims. (Cl. 88—17)

This invention relates to improvements in film gates and more especially to film gates for motion picture projectors.

An important object of the present invention is to provide a film gate of substantially improved efficiency and uniformity of results.

Another object of the invention is to provide an improved film gate wherein all of the components are susceptible of standardization to be readily interchangeable and therefore especially well adapted for mass production methods of manufacture.

Still another object of the invention is to provide an improved motion picture film gate in which although the film strip is confined with utmost closeness to its path through the gate, non-uniformities such as splices in the film are accommodated with exceptional facility.

A further object of the invention is to provide a motion picture film gate in which the film strip is held unusually steady and free from side play.

Another object is to provide a motion picture film gate in which the film strip is placed not only under facewise plate pressure for confining the film strip to a definite plane of travel, but is also maintained under constant equalized side pressure to confine it to a given transverse path.

Yet another object of the invention is to provide a motion picture film gate including an improved construction for easy and convenient removal and cleaning of the film-engaging components.

Another object is to provide an improved motion picture film gate construction which has been devised as a compact unit adapted to be installed in a motion picture projector as a preassembled entity.

Another object is to provide in a motion picture film gate an improved construction for circulation of cooling air to dissipate residual heat from the projection light beam which passes through the gate during operation of the associated projector.

An additional object is to provide a novel cooperative relationship of the film gate structure and the shutter of a motion picture projector.

Other objects, features and advantages of the invention will be apparent from the following detailed description of a preferred exemplary embodiment of the invention taken in conjunction with the accompanying four sheets of drawings, in which.

Figure 1:
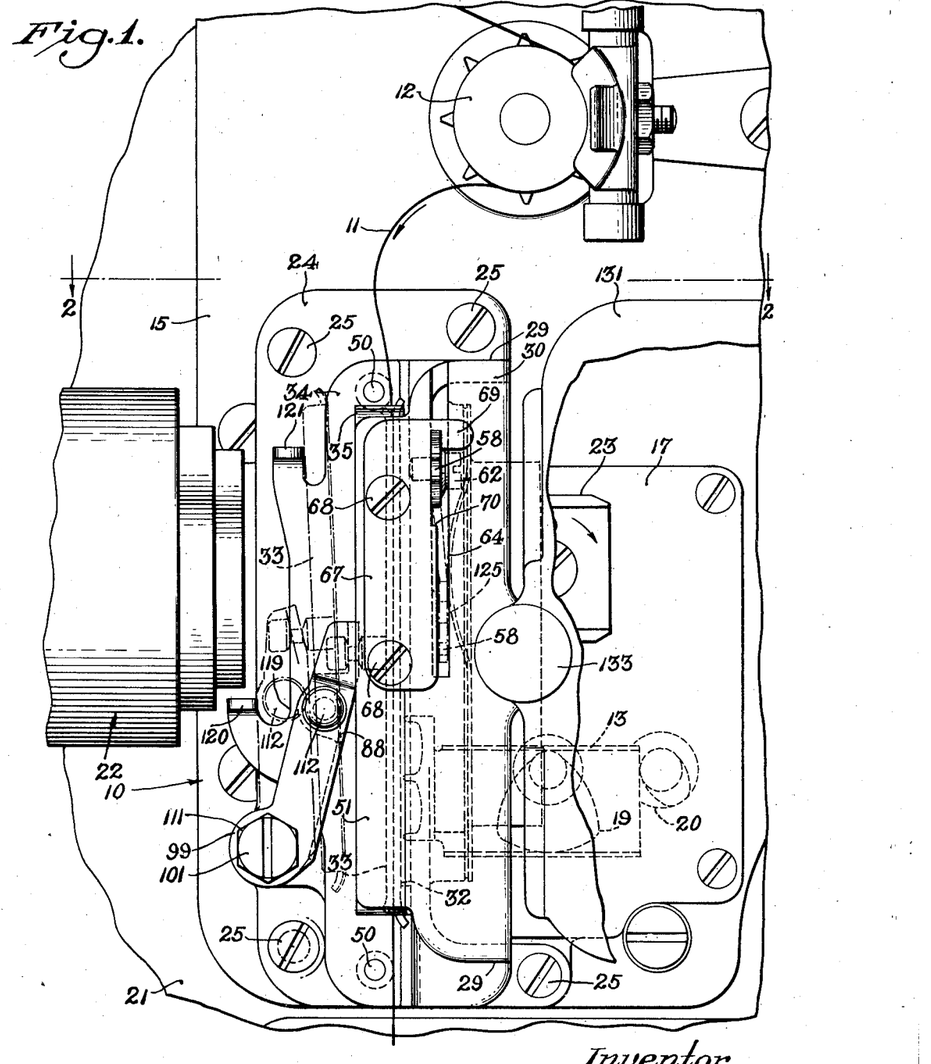
Figure 1 is an enlarged fragmentary side elevational view of a motion picture projector equipped with a film gate embodying the features of the invention.
Figure 4:
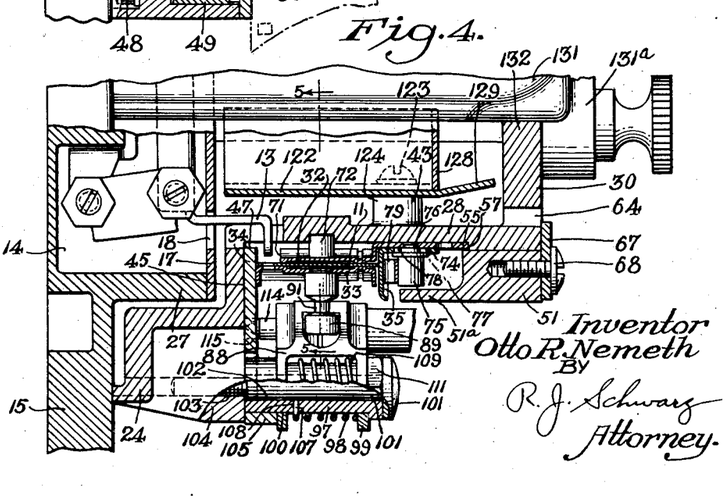
Fig. 4 is a horizontal sectional detail view taken in substantially the plane of line 4—4 of Fig. 3.

Having more particular reference to the drawings, a film gate unit 10 embodying the features of the invention is adapted to receive a motion picture film strip 11 fed thereto in any preferred manner as by means of a continuously operating sprocket 12 and then intermittently drawn through the gate by any preferred means such as a claw type shuttle 13 (Figs. 1 and 4). As illustrated, the shuttle 13 is of the kind covered in my copending application Serial No. 549,897 filed August 17, 1944, having merely the claw structure thereof outside of a shuttle mechanism chamber 14 within a mounting plate casting 15 and enclosed by a removable cover 17 formed with a working opening 18 through which the claw portion of the shuttle extends. Motivation of the shuttle 13 is effected within the chamber 14 by synchronized vertical and horizontal reciprocation cams 19 and 20, respectively. The mounting plate casting 15 is removably carried by a mounting panel 21 of the projector with which the film gate is associated. Also carried by the mounting panel 21 is an objective lens unit 22 which is spaced forwardly of a substantially U-shaped, barrel-type shutter 23. The film gate unit 10 is located on the optical center line of the projection light beam of the projector between the lens unit 22 and the shutter 23.

Figure 2:
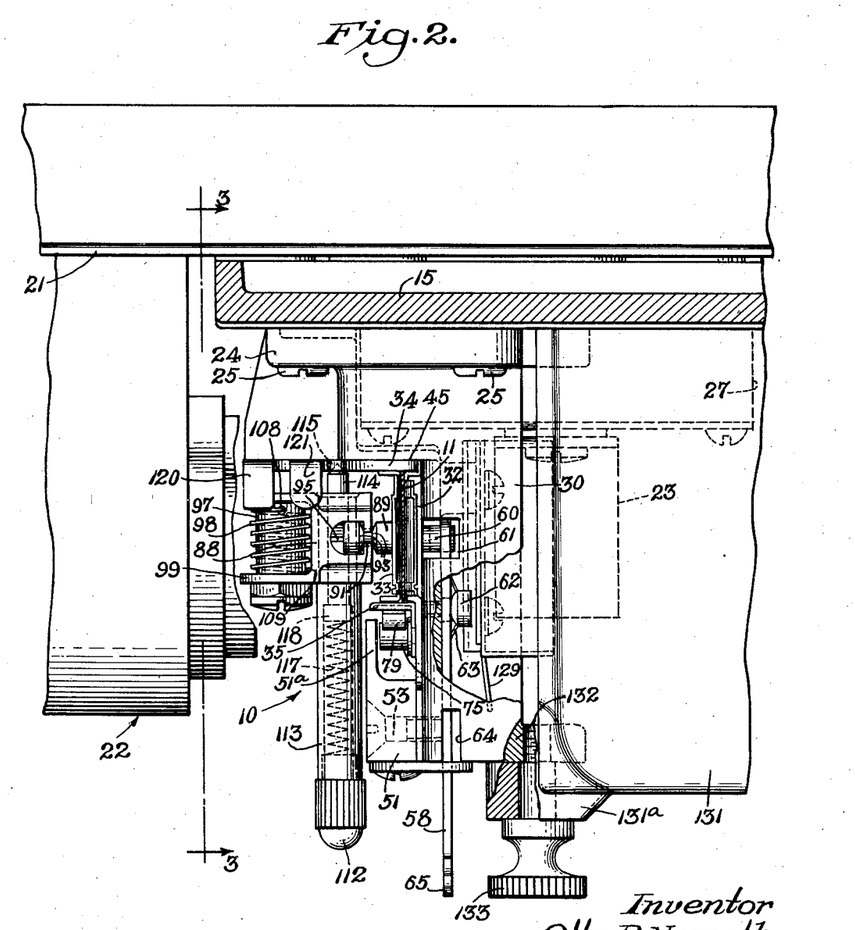
Fig. 2 is a sectional top plan view taken substantially in the plane of line 2—2 of Fig. 1.

In order to enable preassembly of the film gate structure 10 as a self-contained unit adapted to be handled as an entity for quick and easy installation or removal from the projector, a preferably one piece supporting member 24 is provided. This may conveniently be manufactured as a die casting and has a flanged base adapted to be received against the mounting plate 15 and secured demountably as by means of screws 25. As best seen in Figs. 2 and 4 the inner or base portion of the supporting casting 24 is preferably formed in a recessed fashion to accommodate an outwardly projecting wall structure 27 of the shuttle chamber. The balance of the supporting casting 24 comprises principally an outwardly extending relatively thin but appropriately reinforced panel 28 in a plane perpendicularly bisecting the projection axis and providing a frame of substantial width thereabout. Rearwardly extending integral upper and lower marginal reinforcing flanges 29 and a joining outer side marginal reinforcing flange 30 (Figs. 1, 4 and 5) extend rearwardly from the panel 28 and in effect define a rearwardly opening chamber 31. For passage therethrough of the projection light beam of the projector the wall panel 28 is formed with a preferably square opening 31ᵃ of greater dimensions vertically and horizontally than the size of a framed image on the film strip 11.

According to the invention, means comprising the film gate proper are carried by the supporting member 24 and preferably comprise an aperture plate 32, an opposing shoe or pressure plate 33, and one or more film guide plates 34 and 35. These plates function cooperatively to maintain the film 11 centered in the proper vertical plane relative to the projection axis and permit the film to be drawn therethrough intermittently by the shuttle 13. By preference all four plates are adapted to be manufactured from appropriate guages of sheet metal die stamped to form, and appropriately plated and polished to minimize friction.

Figures 5, 6, 7:
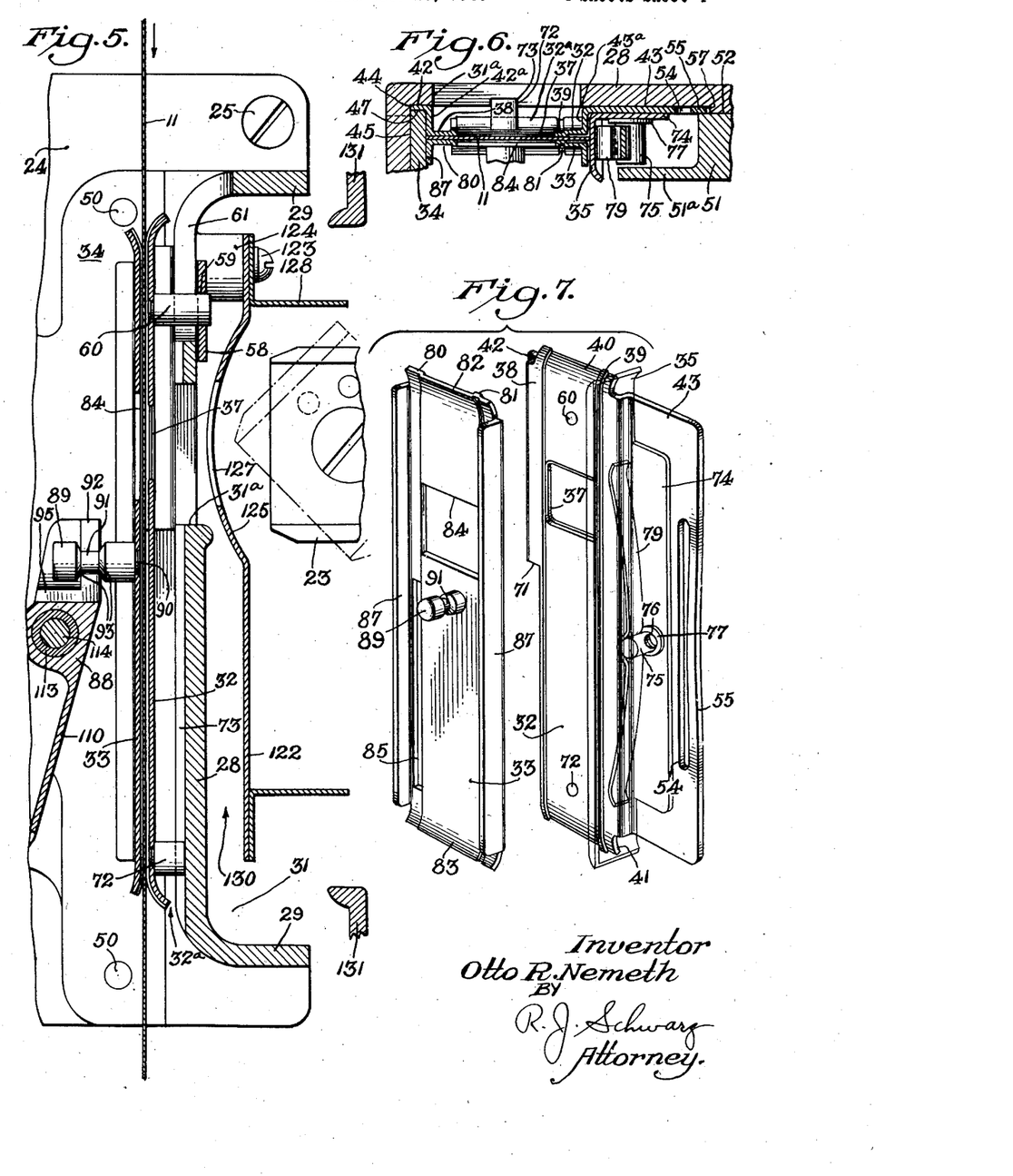
Fig. 5 is an enlarged fragmentary vertical sectional detail view through the film gate taken substantially on the line 5—5 of Fig. 4.
Fig. 6 is an enlarged fragmentary horizontal sectional detail view through the film gate taken substantially in the plane of line 6—6 of Fig. 3.
Fig. 7 is a perspective assembly view partially in phantom outline of the movable film gate components between which a film strip is guided.

A principal function of the aperture plate 32 is, of course, to frame each succeeding image of the film 11 as it registers with the projection light beam of the projector. To this end the plate 32 is formed with a framing aperture 37 of the proper dimensions. The edges defining the aperture 37 are, as best seen in Fig. 7, preferably finished to assure sharp delineation of the projection beam and thus a sharp and clear outline of the projected image. To this end the rear edges of the aperture may be slightly chamfered as shown. In assembly, the aperture plate 32 is mounted along the front face of the supporting panel 28 with the aperture 37 in general axial alignment with the light opening 31ᵃ in the panel.

In a preferred form, the aperture plate 32 is constructed in substantially vertically elongated shape with the aperture 37 formed in the upper portion. For limiting contact of the film with the aperture plate, spaced parallel and coplanar relatively narrow longitudinal spacer pads 38 and 39 are pressed out of the film-opposing face of the aperture plate 32 adjacent to respectively opposite sides. These spacer pads are properly proportioned as to width in order to make only marginal contact with the film 11 laterally of the framed images. In this instance the spacer pad 39 is located adjacent to the outside edge of the plate and is quite narrow and so located as to make contact only in the narrow marginal space between the series of framed images and the sound track, assuming the film 11 to be of the sound-on-film type. At its upper or leading end 40 and at its trailing or lower end 41 the aperture plate 32 is curved back to clear the film entirely and providing smooth cam surfaces avoiding any possibility of catching the film. These curved ends reinforce the aperture plate against bending along longitudinal lines.

Clearance for the cam ends 40 and 41 from the opposing front face of the supporting panel 28 is afforded by a vertical flue space 32ᵃ between the aperture plate 32 and such panel face. Herein this spacing is effected by having the aperture plate 32 formed with coplanar rearwardly offset panel-engaging flanges 42 and 43 (Fig. 6) along its inner and outer vertical margins, respectively. The flanges 42 and 43 engage slidably flatwise against the opposing face of the supporting panel 28 for longitudinal framing movement of the aperture plate. The flue space 32ᵃ permits cooling air to rise between the aperture slate 32 and the supporting panel 28 and dissipate heat transmitted to the plate and panel by the projection light beam. In addition, the offsetting portions 42ᵃ and 43ᵃ of the flanges substantially reinforce the aperture plate against bending on transverse lines.

Confinement of the aperture plate 32 to an undeviating vertical path of adjusted movement is effected by guiding of the side flanges 42 and 43. To this end, as best seen in Fig. 6, the inner flange 42 is received in a right angular corner 44 formed by a forwardly extending shoulder 45 of the supporting member 24 and the base portion of the supporting panel 28. Against this shoulder 45 is secured the inner film guide 34 (see also Figs. 2 and 4). For this purpose the film guide 34 comprises a flat elongated plate of substantial thickness and formed with a vertical rear straight edge 47 arranged to oppose and confine the flange 42 in the corner 44. In a sense therefore, the straight edge 47 cooperates with the right angular walls of the corner 44 to provide a vertical track groove for the flange 42.

Figure 3:
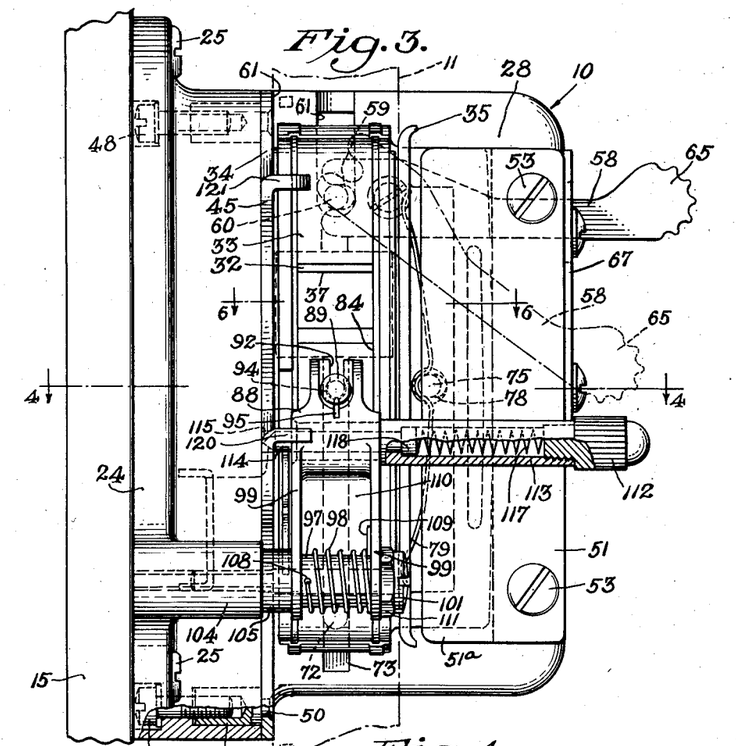
Fig. 3 is a transverse vertical sectional view taken substantially along the line 3—3 of Fig. 2.

As best seen in Fig. 3, the film guide plate 34 may be secured in place in such a manner to to avoid any possibility of roughening or marring of the film engaging surface during installation. Means to this end comprise screws 48 extending from the inner side of the base of the supporting member 24 into threaded fastening engagement with studs 49 secured as by means of permanently smooth integral rivet heads 50 to the inner face of the guide plate 34 and extending inwardly through and beyond the shoulder 45.

Means for confining the outer side flange 43 to a vertical movement path herein comprises a confining member 51 which is mounted upon a land 52 on the opposing forward face of the supporting panel 28 and extends into overlapping relation with the longitudinal margin of the flange 43. Thus, the confining member 51 cooperates with the mounting panel 28 to form a track groove for the flange 43. The width of this track groove is determined by the land 52 which is only barely thicker than the thickness of the flange 43. By preference, the confining member 51 comprises a vertically elongated block which is removably secured to the land 52 by means such as screws 53 (Fig. 3).

By having the groove trackways for the flanges 42 and 43 open at the top, the aperture plate 32 can be readily inserted in place or removed for cleaning by sliding it vertically into or out of the trackways.

In order to restrain movement of the aperture plate 32 out of preferred vertical framing adjustment braking means is provided in connection with the vertical guiding trackways. Herein such means comprises a frictional drag structure conveniently attained by deformation of the track-engaging margin of the outer side flange 43. As best seen in Fig. 7, the flange 43 is formed with a longitudinal slot 54 adjacent to but spaced inwardly from the outer vertical edge and extending to a substantial extent above and below the horizontal center of the edge. This provides an integral narrow marginal braking or drag strip 55 which is partially severed intermediate its ends from the body of the flange and which in the course of manufacture is sprung out of its normal relationship to the flange. By preference the drag strip 55 is not only sprung outwardly relative to the edge of the flange but also sprung out of the plane of the flange. As a result, within the track for the flange 43 the drag strip 55 is placed under resilient tension by forcing of the strip back to approximately the normal plane of the flange between the retaining block 51 and the opposing rearwardly offset portion of the mounting panel 28. The drag strip 55 is also forced inwardly in the plane of the flange 43 by a shoulder 57 defining the opposing surface of the land 52 and which is spaced from the shoulder 45 located at the opposite or inner side of the aperture plate by a distance only sufficient to afford slight clearance for the normal width of the aperture plate. By having the drag strip 55 bowed forwardly or toward the retaining block 51, the resilient reaction is to drive the flange 43 and thus the entire aperture plate 32 frictionally toward and against the opposing surface of the mounting panel 28. The resilient reaction transversely of the aperture plate 32 resulting from edgewise frictional and regressive engagement of the drag strip 55 with the shoulder 57 is to drive the flange 42 into edgewise frictional engagement with the shoulder 45. The results are a very steady and undeviating confinement of the aperture plate 32 to its vertical path and a very effectual braking drag upon longitudinal movement of the plate in such path thoroughly resistive to ordinary jarring or vibration of the apparatus. However, the drag can be readily overcome by simple manual force applied to move the aperture plate into any adjusted framing position.

Framing adjustment of the aperture plate 32 is effected by means such as a pivoted, digitally manipulable framing lever 58 (Figs. 1, 2 and 3). This lever has its inner end notched out as at 59 to provide a bifurcation to receive and engage a framing stud 60. This stud is riveted to extend rearwardly from the longitudinal center of the aperture plate 32 above the aperture 31 and projects through a clearance slot 61 cutting vertically through the upper portion of the mounting panel 28 and the adjacent portion of the upper reinforcing flange 29. Pivotal attachment of the framing lever 58 to the rear face of the mounting panel 28 is effected by means such as a screw 62. A spider-type spring washer 63 (Fig. 2) interposed between the rear face of the framing lever and the head of the screw 62, by which it is compressed, drives the lever frictionally against the opposing wall of the mounting panel. The free end portion of the framing lever 58 projects through a vertical slot 64 in the vertical flange 30 and may be formed with a finger grip head 65 which may be enlarged and radially toothed as best seen in Fig. 3 for convenience in manipulation. By having the pivot for the lever 58 relatively closely adjacent to its inner or bifurcated framing pin engaging end relatively powerful leverage is attained. Therefore, very fine graduations of framing adjustment may be accomplished quite easily in spite of the substantial frictional drag to which the aperture plate 32 is normally subjected as hereinbefore described.

For quick removal or replacement of the aperture plate 32, the framing lever 58 is adapted to be swung down to a position as indicated in broken outline in Figs. 1 and 3 wherein the upper bifurcation finger defining the notch 59 clears the framing stud 60 for free vertical movement into and out of the bifurcation. For this purpose the framing lever slot 64 extends down a substantial distance below the top of the supporting panel 28 sufficient to afford clearance for the plate-releasing down-swing of the framing lever.

Means are provided, however, for normally confining the pivotal movement of the framing lever 58 to a range ample for actual framing. Herein such means comprises a stop plate 67 which is by preference secured to the retaining block 51 as by means of screws 68 (Figs. 1 and 4) so as to lie alongside the forward edge of the slot 64 with an upper stop finger 69 overlying and blocking upward movement of the framing lever beyond a certain point. A spaced lower stop shoulder 70 blocks downward movement of the framing lever beyond a predetermined lower limit. The stop shoulder 70 however is of a width to block the slot 64 only partially and to an extent which affords a clearance between the edge of the stop plate 67 below such shoulder and the opposite edge of the slot 64 sufficient to accommodate the full width of the framing lever 58 freely when the latter is wilfully flexed rearwardly to clear the stop shoulder, as shown in broken outline in Fig. 1. Thus, while the framing lever 58 is confined to a relatively limited range of pivotal movement for framing purposes, it can be readily swung down into aperture-plate-releasing position in response to a rearward flexing coincident with downward movement to clear the stop shoulder 70. To return the framing lever 58 to framing position, it need merely be pushed up toward the horizontal until it snaps back over the stop shoulder 70 into the position where it is limited to framing movement between the stop shoulder 70 and the overlying stop finger 69.

Inasmuch as the aperture plate 32 is interposed between the film strip 11 and the shuttle 13, clearance must be provided for the latter in the aperture plate. In the present instance this is accomplished by cutting away the lower portion of the flange 42 and the adjacent spacer pad 38 as indicated at 71 (Figs. 4 and 7). By providing the cutaway 71 clear to the lower end of the aperture plate, the latter can be inserted or removed even when the shuttle 13 comes to rest with the claw teeth thereof extending through the plane of the aperture plate. Any tendency of the shuttle plate 32 to skew in its plane or tilt rearwardly under frontal pressure into the flue space 32ᵃ as a result of the cutaway 71 is prevented by the provision of a spacer and guide pin 72 secured as by riveting to the lower end portion of the aperture plate and projecting rearwardly into a vertical guide groove 73 formed in the opposing face of the supporting panel 28.

Herein the width of the complementary aperture and pressure plates 32 and 33, respectively, are narrower than the film 11 where the film passes therebetween; and the guide plates 34 and 35 engage the film edgewise for guidance. While the inner guide plate 34 is preferably fixed, the outer guide plate 35 is preferably movably mounted and resiliently biased to bear against the outer edge of the film strip 11 and thrust the film transversely in its plane toward the fixed guide plate 34. Thereby the film is quite accurately and positively held against transverse movement and this assures extreme steadiness in the projected image, assuming of course that the film is in good condition. For convenience in mounting and handling, the movable guide 35 may be assembled in a unit with the aperture plate 32. Accordingly, the guiding flange 43 of the aperture plate is formed of ample width to accommodate a right angular base flange 74 of the guide member slidably and with the guiding portion of the guide member 35 opposing the shoulder provided by the offset joining the flange 43 to the body of the aperture plate 32.

Permanent attachment of the base flange 74 to the aperture plate flange 43 may be effected by means such as a stud 75 (Fig. 4) extending through the flange 74 and riveted to the flange 43 in a stud hole 76. The stud is formed with a collar 77 retaining the flange 74 in place in a slidable manner to enable self-equalizing rocking adjustment of the guide member about the stud and bodily movement of the guide member transversely to accommodate slight variations in film width or unevennesses such as might be caused by a poorly made splice. For this purpose the flange 74 is formed with a horizontally elongated slot 78 dimensioned to afford slidable engagement with the base portion of the stud 75 to hold the guide member against longitudinal movement but permitting a substantial range of rocking and transverse or horizontal movement.

Means for normally pressing the movable guide 35 resiliently toward film engagement preferably comprises an elongated bowed leaf spring 79. This spring is centrally convoluted to cradle the stud 75 which projects forwardly beyond the collar 77 for this purpose and serves to hold the spring under tension driving inwardly toward the guide portion of the movable guide member 35. By having the spring 79 relatively long and with its ends formed with balanced, reversely curved, smooth pressure pads engaging the adjacent face of the movable guide 35 near but equally spaced from each respective end, uniform relatively moderate but firm, equalized pressure is maintained upon the edge of the film 11 to press the film steadily and uniformly toward the fixed guide 34 while yet making adequate allowance for any irregularities such as bad splices in the film. At its upper and lower and forward edges the movable guide member 35 is preferably curved in lip-form away from its active or film-engaging face to afford stiffening reinforcement and also cam surfaces which will avoid catching of the film strip or cooperative, relatively movable film gate components on the edges. The cam surface or lip of the vertical edge enables camming of the guide member 35 outwardly by the pressure plate 33 when the latter is moved into the closing position in the gate in the absence of the slightly wider film strip 11 which when in place in the gate holds the guide plate member 35 away from the pressure plate as shown. The lower cam edge also serves to ease past the pressure plate 33 when the aperture-plate-guide-member unit is installed while the pressure plate is in the closed gate position in the absence of the film.

As shown in full outline in Fig. 1, the pressure plate 33 is adapted in the closed gate position to bear toward the aperture plate 32 and thus hold the film strip 11 flat against the aperture plate. The pressure plate is also adapted to be opened or moved away from the aperture plate, into a position as shown in broken outline, for such purposes as to enable threading of the film through the gate or for cleaning the gate when desirable.

Referring now to Fig. 7, the pressure plate 33 is substantially as long and as wide as the film-opposing or body portion of the aperture plate 32 and of generally complementary construction. To limit engagement of the pressure plate to the image-free marginal portions of the film strip, parallel longitudinal engagement and spacer pads 80 and 81 are formed in the film-opposing face of the plate as by pressing the metal out of the normal face plane substantially complementary to and in direct opposition to the spacer and contact pads 38 and 39 of the aperture plate. At its upper and lower ends, the pressure plate is curved away from the film opposing face to form cam lips 82 and 83, respectively, which are substantial counterparts of the upper and lower cam lips 40 and 41 of the aperture plate. The cam lips 40 and 82 cooperate at the upper or lead-in end of the film gate in substantially funnel fashion enabling easy entry of a film splice into the gate. When inserting the aperture plate 32 in place in the absence of the film 11 and while the pressure plate 33 is in closing position, the cam lip 41 cooperates with the cam lip 82 to ease the plate into assembly.

An image framed by the aperture 37 is projected through a projection opening 84 in the pressure plate and which is at least as wide as the framing aperture but is preferably of substantially greater dimension vertically in order to afford ample clearance for framing adjustment of the aperture 37. Registering with the claw-cutaway 71 of the aperture plate is a vertical clearance slot 85 in the pressure plate to accommodate the claw teeth of the shuttle 13. Substantial rigidity of the pressure plate 33 is assured even though the plate is made from relatively thin sheet metal by having the vertical edges of the plate formed with right angular reinforcing flanges 87. The flanges 87 are smoothly finished on the outer faces for as nearly as practicable frictionless engagement of the film guides 34 and 35.

According to the invention, the pressure plate 33 is mounted in a manner to be self-aligning and self-equalizing in operation, readily demountable for cleaning, resiliently pressed into engagement with the film which is backed against the aperture plate, and easily and quickly movable into gate closing or opening positions. To this end the pressure plate 33 is mounted upon a resiliently biased and rockable carrying member or hinge arm 88 with which it is detachably connectable by means such as a central forwardly projecting stud 89. Attachment of the stud 89 to the pressure plate 33 may be effected in any suitable manner as for example by riveting, the stud being formed with an integral riveting head 90 for this purpose (Fig. 5).

A substantially flexible self-aligning and self-equalizing connection of the stud 89 with the hinge arm 88 is effected by forming the stud with an intermediate annular groove providing a reduced diameter neck 91 adapted to be received within an upwardly opening slot 92 providing a bifurcation to cradle the neck in the upper end of the arm (Figs. 2, 3, 4 and 5). Relatively free rocking of the pressure plate 33 within certain limits is enabled by affording adequate play of the neck 91 in the slot 92, as by having the neck slightly longer than the width of the bifurcation legs of the hinge arm and by beveling the walls of the neck-forming groove as indicated at 93 as well as by relative proportioning of the neck 91 slightly smaller in diameter than the neck-cradling bottom of the slot which is slightly enlarged for the purpose as indicated at 94 in Fig. 3. Above the cradling enlargement 94, the walls of the slot 92 are preferably slightly narrower than the diameter of the neck 91 so that the neck will be retained aaginst jostling out of the slot, or unintentional disassembly of the pressure plate by withdrawal of the aperture plate 32 for cleaning or the like. The inherent resiliency of the bifurcation legs, enhanced by elongation through vertical slitting as at 95 down through the bottom of the slot 92, is relied upon to enable forcing of the neck 91 into and out of the slot in response to manipulating effort for that purpose.

A resiliently biased hinge mounting for the hinge arm 88 is afforded by a hinge pin member 97 and resilient means such as a coiled tension spring 98 (Figs. 3 and 4). To accommodate the hinge pin 97 slidably, the lower end portion of the hinge arm 88 is formed with a pair of spaced parallel bearing legs 99 having coaxial bearing holes 100 for slidably receiving the bearing pin with the spring 98 encircling that portion of the pin which is between the bearing legs. Rigid securement of the hinge pin 97 is effected by means such as a screw 101 extending through an axial bore 102 in the pin and into a threaded bore 103 within a supporting boss 104 integral with the supporting member 24. Proper spacing between the end of the boss 104 and the adjacent bearing leg 99 is maintained by a spacer 105 encircling the adjacent end portion of the hinge pin 97.

Assembly of the tension spring 98 with the hinge pin 97 is accomplished while the spring is in an untensioned coiled condition and held between the hinge arm legs 99 coaxial with the bearing holes 100. One end of the spring is formed with an inwardly extending anchoring finger 107 (Fig. 4) which is inserted into a radial anchoring bore 108 in the hinge pin while the opposite end of the spring is formed as a straight pressure finger 109 (Fig. 3) and is brought to bear against a web 110 joining the bearing leg forwardly of the hinge pin. To place the spring 98 under the preferred pressure-plate-biasing tension, the hinge pin 97 is rotated to wind up the spring as for example by the application of a wrench to a hex head 111 provided on the outer end of the pin until the condition in Fig. 2 is attained as compared to Figs. 3 and 4. Then the hinge pin is secured fast in the preferred condition of spring tensioning adjustment by tightening the screw 101. The biasing action of the spring 98 normally urges the hinge arm 88 clockwise as seen in Figs. 1 and 5 and thereby drives the pressure plate 33 toward the aperture plate 32.

In order to enable opening of the pressure plate 33 in opposition to the biasing spring 98, the hinge arm 88 is equipped with a handle 112 which in the present instance is formed as a knurled head threaded into an elongated tubular stem 113 which is secured to the hinge leg as by having the inner end formed of reduced diameter to extend transversely through the hinge arm to which it is riveted (Figs. 2, 3 and 5). The handle 112 extends out into the clear beyond the adjacent film gate structure where it can be conveniently manipulated.

Retention of the pressure plate assembly in closed position, but permitting such slight yielding thereof as is demanded for passage of a splice in the film 11 through the gate, is accomplished by means such as a yieldable, cam-tipped detent 114 which is preferably in the form of a plunger extending from the inner end of the hollow interior of the handle stem 113 and engaging in the closed position of the gate relatively loosely within a detent socket 115 in the guide plate 34. The operative or extended position of the detent 114 is maintained resiliently by means such as a coiled compression spring 117 bearing against a limiting head 118 on the inner end of the detent member. The spring 117 is maintained under tension by the handle 112 which is threaded thereagainst and closes the bore by which the spring and the detent plunger are assembled in the device.

To open the film gate, the hinge arm 88 is rocked counterclockwise into the position as seen in broken outline in Fig. 1. This is accomplished by forcing the detent 114 to cam out of the socket 115 and ride over the adjacent portion of the guide plate 34 until the tip of the detent passes the forward edge and holds the film gate open against unintentional return of the hinge arm 88 to gate-closing position under the influence of the rocking spring 98.

Over-rocking of the hinge arm 88 when opening the film gate is prevented by an integral stop arm 120 on the guide plate 34 which is interposed in the path of the hinge arm 88 to engage it at approximately the point of maximum force applied through the handle 112 in opening the film gate. The arrangement of the stop arm 120 and the detent-engaged forward edge of the guide plate 34 is such that when the pressure plate 33 is in fully open position it is held clear of the foward edge of the edge guide 35 and the forward surface of the retainer block 51 to provide a threading cap. This enables the film strip 11 to be manipulated for threading purposes sidewise into or out of position in the film gate. Any tendency of the pressure plate 33 to tilt into obstructing relation in the threading gap is prevented by a tilting stop arm 121 integral with the guide plate 34 adjacent to its upper end and engageable with the open pressure plate adjacent to its upper end, as seen in broken outline in Fig. 1. After the film threading has been completed, the pressure plate 33 can be practically instantaneously snapped back into film pressing position by releasing the detent 114 responsive to pressure in a rearward direction applied through the handle 112.

A guard against catching of the film on the forward edge of the movable guide 35 during threading is provided by an inwardly extending lip 51ᵃ on the confining block 51 (Figs. 2, 3, 4 and 6). This lip also serves to conceal the adjacent parts of the aperture plate-edge guide unit 32, 35 and thus enhances the appearance of the film gate.

Leakage of light from behind the film gate is avoided by a box-like shield or baffle 122 (Figs. 4 and 5) which is removably secured as by means of screws 123 to upper and lower attachment bosses 124 which project to an equal distance integrally rearwardly from the mounting panel 28. In order to enable location of the shutter 23 as close as practicable to the light beam opening 31ᵃ, the main panel of the baffle 122 is preferably bowed intermediate its ends as indicated at 125 (Figs. 1 and 5) to clear the sweeping edges of the shutter as it revolves. This bowed portion has a light beam opening 127. Along the top, bottom and outer sides, the baffle member is preferably provided with a right angular rearwardly extending light baffling flange 128, amply clearing the shutter 23 but partially boxing it in to intercept stray light rays which might otherwise escape from behind the film gate. Any likelihood of reflected or direct light rays being visible by reflection or otherwise through the framing lever slot 64 is prevented by a laterally extending and preferably slightly rearwardly inclined baffle wing or flange 129 (Figs. 2 and 4) extending from the outer edge of the baffle member 122.

By having the baffle member 122 made of a relatively light guage sheet metal and spaced from adjacent environmental features, as well as relatively exposed to atmosphere of the rear of the film gate, as clearly apparent in Fig. 1, either natural or forced draft air cooling is promoted or at least facilitated. In fact, the space between the main body of the baffle member 122 and the mounting panel 128 is of such proportion as to provide a good vertical flue 130 (Fig. 5) up which cool air may be drawn with predetermined velocity or may ascend by convection at a rate proportionate to the degree of heating from the projection light beam. This is a particularly advantageous arrangement because the potentially greatest heating will occur at the upper part of the structure while the lower part which is less heated nevertheless extends substantially below the heated zone and provides a relatively long cool-air updraft flue in which the cooling air velocity can build up. It may also be noted that the forwardly bowed portion 125 of the baffle member, and which of all the structure in the film gate construction is likely to be the most intensely heated due to its primary interception of substantial marginal portions of the light beam, bulges directly into the path of the upwardly sweeping air in the flue 130 whereby to gain the maximum advantage of the cooling air sweeping through the flue.

Rearwardly from the baffle member 122 the shutter 23 and the space through which the projection light travels to the shutter is enclosed by a removable cover 131 which at its forward end is spaced from the supporting panel 28 and the flanges 29 and 30 and surrounds the rear portion of the baffle flange 122 in adequately spaced relation to provide a substantial air gap permitting free circulation of ventilating or cooling air past its forward edge. Such air may be drawn into and through the enclosure provided by the cover 131 by forced draft circulation means (not shown). The cooperative relationship of the baffle member 122 and the cover 131 avoids light leakage from within the cover through the air gap.

Partial support and attachment of the cover 131 is preferably accomplished at its forward end by securing an integral forwardly projecting horizontally perforated attachment ear 131ᵃ to a rearwardly extending complementary attachment ear 132 on the flange 30 as by means of a thumb screw 133 (Figs. 1, 2 and 4). Further support, though not here shown, may be provided for the cover 131 adjacent its rear end.

While I have illustrated and described a preferred embodiment of my invention, it is to be understood that I do not thereby intend to limit my invention to the specific details disclosed, but contemplate that various modifications, substitutions and alternative constructions may be effected without departing from the spirit and scope of the invention as described in the appended claims.

I claim:

1. In combination in a film strip projection apparatus, a film gate comprising an aperture plate adapted to make contact with the marginal edges of the film strip, means confining said aperture plate to a vertical path of adjusted movement, means for selectively moving said plate, a pressure plate in opposing relationship to said aperture plate, said pressure plate being mounted on a resiliently biased rockable arm, means associated with said arm for rocking said pressure plate, and guide means engageable with opposite edges of the film strip for maintaining said film strip in an undeviated path of travel through the film gate, said guide means including a resiliently biased member mounted to yield laterally and rockably in response to variations in the width of the film strip.

2. In combination in a film strip projection apparatus, a film gate comprising an aperture having spacer pads pressed out of the film opposing face of said plate, said pads adapted to make contact with the marginal edges of the film strip, means confining said aperture plate to a vertical path of adjusted movement, means for selectively moving said plate, means for frictionally restraining movement of said plate, a pressure plate having spacer pads pressed out of the film opposing face of said plate in opposing relationship to said first mentioned pads, said pressure plate being mounted on a resiliently biased rockable arm, means associated with said arm for rocking said pressure plate, and guide means engageable with opposite edges of the film strip for maintaining said film strip in an undeviating path of travel through the film gate, said guide means including a resiliently biased member mounted to yield laterally and rockably in response to variations in the width of the film strip.

3. In combination in a film strip projection apparatus, a film gate comprising an aperture plate adapted to make contact with the marginal edges of the film strip, said plate being provided with marginal rearwardly offset flanges cooperating with guide means to confine said plate to a vertical path of adjusted movement, means for selectively moving said plate, a pressure plate in opposite relationship to said aperture plate, said pressure plate being mounted on a resiliently biased rockable arm, means associated with said arm for rocking said pressure plate, and guide means engageable with opposite edges of the film strip for maintaining said film strip in an indeviated path of travel through the film gate, said guide means including a resiliently biased member mounted to yield laterally and rockably in response to variations in the width of the film strip.

4. In combination in a film strip projection apparatus, a film gate comprising an aperture plate having spacer pads pressed out of the film opposing face of said plate, said pads adapted to make contact with the marginal edges of the film strip, said plate being provided with marginal rearwardly offset flanges cooperating with guide means to confine said plate to a vertical path of adjusted movement, means for selectively moving said plate, a pressure plate having spacer pads pressed out of the film opposing face of said plate in opposing relationship to said first mentioned pads, said pressure plate being mounted on a resiliently biased rockable arm, means associated with said arm for rocking said pressure plate, and guide means engageable with opposite edges of the film strip for maintaining said film strip in an undeviated path of travel through the film gate, sad guide means including a resiliently biased member mounted to yield laterally and rockably in response to variations in the width of the film strip.

5. In combination in a film strip projection apparatus, a film gate comprising an aperture plate adapted to make contact with the marginal edges of the film strip, said plate being provided with marginal rearwardly offset flanges cooperating with guide means to confine said plate to a vertical path of adjusted movement, a bowed portion struck out of the plane of one of said flanges and engageable with said guide means to frictionally restrain movement of said aperture plate, a pressure plate in opposing relationship to said aperture plate, said pressure plate being mounted on a resiliently biased rockable arm, means associated with said arm for rocking said pressure plate, and guide means engageable with opposite edges of the film strip for maintaining said film strip in an undeviated path of travel through the film gate, said guide means including a resiliently biased member mounted to yield laterally and rockably in response to variations in the width of the film strip.

6. In combination in a film strip projection apparatus, a film gate comprising an aperture plate adapted to make contact with the marginal edges of the film strip, means confining said aperture plate to a vertical path of adjusted movement, means for selectively moving said plate, a pressure plate in opposing relationship to said first mentioned plate, means for detachably mounting said pressure plate on a resiliently biased rockable arm, said means including a slot in the upper end of said arm and a stud on said plate engageable in sad slot, means associated with said arm for rocking said pressure plate, and guide means engageable with opposite edges of the film strip for maintaining said film strip in an undeviated path of travel toward the film gate, said guide means including a resiliently biased member mounted to yield laterally and rockably in response to variations in the width of the film strip.

7. In combination in a film strip projection apparatus, a film gate comprising an aperture plate having spacer pads pressed out of the film opposing face of said plate, said pads adapted to make contact with the marginal edges of the film strip, means confining said aperture plate to a vertical path of adjusted movement, means for selectively moving said plate, means for frictionally restraining movement of said plate, a pressure plate having spacer pads pressed out of the film opposing face of said plate in opposing relationship to said first mentioned pads, means for detachably mounting said pressure plate on a resiliently biased rockable arm, said means including a slot in the upper end of said arm and a stud on said plate engageable in said slot, and guide means engageable with opposite edges of the film strip for maintaining said film strip in an undeviated path of travel through the film gate, said guide means including a resiliently biased member mounted to yield laterally and rockably in response to variations in the width of the film strip.

OTTO R. NEMETH.

REFERENCES CITED

The following references are of record in the file of this patent:

UNITED STATES PATENTS

| Number | Name | Date |
| --- | --- | --- |
| 1,987,406 | May | Jan. 8, 1935 |
| 2,232,811 | Sperry | Feb. 25, 1941 |
| 2,374,486 | Howell | Apr. 24, 1945 |
| 1,991,870 | Schulz | Feb. 19, 1935 |
| 1,933,066 | Merle | Oct. 31, 1933 |
| 1,937,976 | Merle | Dec. 5, 1933 |
| 2,007,188 | Foster et al. | July 9, 1935 |
| 1,437,895 | Horst | Dec. 5, 1922 |
| 1,126,589 | Tessier | Jan. 26, 1915 |
| 1,884,609 | Dina | Oct. 25, 1932 |
| 2,142,606 | Debrie | Jan. 3, 1939 |
| 2,229,924 | Howell | Jan. 28, 1941 |
| 1,365,102 | Hockstetter | Jan. 11, 1921 |
| 1,559,815 | Victor | Nov. 3, 1925 |
| 1,855,775 | Shapiro | April 26, 1932 |
| 2,049,042 | Berggren | July 28, 1936 |
| 1,287,576 | DeVry | Dec. 10, 1918 |
| 2,186,618 | Phillips | Jan. 9, 1940 |
| 2,194,585 | Brenkert | March 26, 1940 |
| 1,059,067 | Porter | Apr. 15, 1913 |
| 2,140,738 | Fitz | Dec. 20, 1938 |
| 2,192,641 | Griffin et al. | Mar. 5, 1940 |
| 2,089,275 | Lindstrom | Aug. 10, 1937 |
| 1,993,209 | Craig | March 5, 1935 |
| 2,057,153 | Lessler | Oct. 13, 1936 |
| 2,319,318 | Githens et al. | May 18, 1943 |